(12) United States Patent
Ding

(10) Patent No.: US 11,792,382 B2
(45) Date of Patent: Oct. 17, 2023

(54) HETEROGENEOUS VEHICLE CAMERA STEREO PAIR SYSTEM AND METHOD FOR DEPTH ESTIMATION

(71) Applicant: Volvo Car Corporation, Gothenburg (SE)

(72) Inventor: Sihao Ding, Sunnyvale, CA (US)

(73) Assignee: Volvo Car Corporation, Gothenburg (SE)

( * ) Notice: Subject to any disclaimer, the term of this patent is extended or adjusted under 35 U.S.C. 154(b) by 0 days.

(21) Appl. No.: 17/367,706

(22) Filed: Jul. 6, 2021

(65) Prior Publication Data

US 2023/0008027 A1   Jan. 12, 2023

(51) Int. Cl.
| | |
|---|---|
| H04N 13/25 | (2018.01) |
| G06T 7/593 | (2017.01) |
| H04N 13/239 | (2018.01) |
| G05D 1/02 | (2020.01) |
| B60R 11/04 | (2006.01) |
| H04N 13/00 | (2018.01) |

(52) U.S. Cl.
CPC ........... *H04N 13/25* (2018.05); *G05D 1/0231* (2013.01); *G06T 7/593* (2017.01); *H04N 13/239* (2018.05); *B60R 11/04* (2013.01); *G06T 2207/10012* (2013.01); *G06T 2207/30252* (2013.01); *H04N 2013/0081* (2013.01)

(58) Field of Classification Search
CPC .... G05D 1/0231; H04N 13/239; H04N 13/25; G06T 7/593
USPC .......................................................... 348/47
See application file for complete search history.

(56) References Cited

U.S. PATENT DOCUMENTS

| | | | | |
|---|---|---|---|---|
| 2018/0012085 A1* | 1/2018 | Blayvas | ................. | G06F 3/017 |
| 2019/0382018 A1* | 12/2019 | Garnault | ......... | B60W 30/18163 |
| 2020/0302627 A1* | 9/2020 | Duggal | .................. | G06N 20/00 |
| 2020/0314333 A1* | 10/2020 | Liang | ..................... | G06V 20/52 |

FOREIGN PATENT DOCUMENTS

| | | |
|---|---|---|
| DE | 102018100909 A1 | 7/2019 |
| EP | 4117284 A1 | 1/2023 |

OTHER PUBLICATIONS

Nov. 30, 2022 European Search Report issued in corresponding EP Application No. 22181047.
Jan. 16, 2023 Communication Pursuant to Rule 69 EPC issued in corresponding EP application No. 22180147.5.

* cited by examiner

*Primary Examiner* — On S Mung
(74) *Attorney, Agent, or Firm* — Clements Bernard Walker; Christopher L. Bernard

(57) ABSTRACT

A stereo pair camera system for depth estimation, including: a first camera disposed in a first position along a longitudinal axis, a lateral axis, and a vertical axis and having a first field of view; and a second camera disposed in a second position along the longitudinal axis, the lateral axis, and the vertical axis and having a second field of view; wherein the first camera is a of a first type and the second camera is of a second type that is different from the first type; and wherein the first field of view overlaps with the second field of view. Optionally, the first position is spaced apart from the second position along one or more of the longitudinal axis and the vertical axis. The depth estimation is used by one or more of a driver assist system and an autonomous driving system of a vehicle.

18 Claims, 6 Drawing Sheets

HETEROGENEOUS VEHICLE CAMERA STEREO PAIR SYSTEM AND METHOD FOR DEPTH ESTIMATION

TECHNICAL FIELD

The present disclosure relates generally to the visual imaging and automotive fields. More particularly, the present disclosure relates to a heterogeneous vehicle camera stereo pair system and method for depth estimation.

BACKGROUND

Two cameras with overlapping fields of view can be used to produce stereo vision. A stereo pair is a set of two cameras viewing the same scene each from a different perspective, the view disparity producing a depth map and stereo vision. Typically, a stereo pair is formed by two identical cameras, placed horizontally, with their optical axes in parallel. The use of identical cameras, horizontal placement, and parallel optical axes limits computational complexity and simplifies the required software, as the search space can be limited and points readily matched between the overlapping images. These constraints, however, can be overly limiting and impractical in real world applications, such as automotive applications.

This background is provided as an illustrative contextual environment only. It will be readily apparent to those of ordinary skill in the art that the systems and methods of the present disclosure may be implemented in other contextual environments as well.

SUMMARY

The present disclosure provides a heterogeneous vehicle camera stereo pair system and method for depth estimation that utilize different cameras that are arbitrarily placed, with fields of view that arbitrarily overlap. Thus, conventional setup constraints are relaxed. For example, the stereo pair may include a pinhole camera or the like that is disposed vertically above and longitudinally behind a fisheye camera or the like on a vehicle, both of which are laterally aligned with respect to the vehicle. This is a common vehicle camera setup which has never been exploited to provide stereo vision. Likewise, the stereo pair may include a left or right looking camera and a forward looking camera, or a left or right looking camera and a backward looking camera, etc. Again, any of the cameras may be pinhole cameras, fisheye cameras, etc. The optical axes can be parallel but vertically disposed, disposed at angles, longitudinally offset, etc.

In one illustrative embodiment, the present disclosure provides a stereo pair camera system for depth estimation, the stereo pair camera system including: a first camera disposed in a first position along a longitudinal axis, a lateral axis, and a vertical axis and having a first field of view; and a second camera disposed in a second position along the longitudinal axis, the lateral axis, and the vertical axis and having a second field of view; wherein the first camera is a of a first type and the second camera is of a second type that is different from the first type; and wherein the first field of view overlaps with the second field of view. Optionally, the first position is spaced apart from the second position along the lateral axis. Optionally, the first position is spaced apart from the second position along one or more of the longitudinal axis and the vertical axis. Optionally, the first type is a fisheye camera and the second type is a pinhole camera. Optionally, the first type and the second type are each one of a forward looking camera and a backward looking camera. Optionally, the first type is one of a forward looking camera and a backward looking camera and the second type is a side looking camera. Each of the first camera and the second camera are coupled to a vehicle. The depth estimation of the stereo pair camera system is used by one or more of a driver assist system and an autonomous driving system of the vehicle.

In another illustrative embodiment, the present disclosure provides a stereo pair camera system for depth estimation, the stereo pair camera system including: a first camera disposed in a first position along a longitudinal axis, a lateral axis, and a vertical axis and having a first field of view; and a second camera disposed in a second position along the longitudinal axis, the lateral axis, and the vertical axis and having a second field of view; wherein the first position is spaced apart from the second position along one or more of the longitudinal axis and the vertical axis; and wherein the first field of view overlaps with the second field of view. Optionally, the first position is spaced apart from the second position along the lateral axis. Optionally, the first camera is a of a first type and the second camera is of a second type that is different from the first type. Optionally, the first type is a fisheye camera and the second type is a pinhole camera. Optionally, the first type and the second type are each one of a forward looking camera and a backward looking camera. Optionally, the first type is one of a forward looking camera and a backward looking camera and the second type is a side looking camera. Each of the first camera and the second camera are coupled to a vehicle. The depth estimation of the stereo pair camera system is used by one or more of a driver assist system and an autonomous driving system of the vehicle.

In a further illustrative embodiment, the present disclosure provides a depth estimation method, including: providing a first camera disposed in a first position along a longitudinal axis, a lateral axis, and a vertical axis and having a first field of view; providing a second camera disposed in a second position along the longitudinal axis, the lateral axis, and the vertical axis and having a second field of view; wherein the first camera is a of a first type and the second camera is of a second type that is different from the first type; and wherein the first field of view overlaps with the second field of view; obtaining a first image using the first camera; obtaining a second image using the second camera; and performing a depth estimation for at least a portion of a scene captured in both the first image and the second image using a stereo vision algorithm. The first position is spaced apart from the second position along one or more of the lateral axis, the longitudinal axis, and the vertical axis. One or more of: the first type is a fisheye camera and the second type is a pinhole camera; the first type and the second type are each one of a forward looking camera and a backward looking camera; and the first type is one of a forward looking camera and a backward looking camera and the second type is a side looking camera. The depth estimation method also includes providing the depth estimation to one or more of a driver assist system and an autonomous driving system of a vehicle.

BRIEF DESCRIPTION OF THE DRAWINGS

The present disclosure is illustrated and described herein with reference to the various drawings, in which like reference numbers are used to denote like system components/method steps, as appropriate, and in which.

DESCRIPTION OF ILLUSTRATIVE EMBODIMENTS

Again, the present disclosure provides a heterogeneous vehicle camera stereo pair system and method for depth estimation that utilize different cameras that are arbitrarily placed, with fields of view that arbitrarily overlap. Thus, conventional setup constraints are relaxed. For example, the stereo pair may include a pinhole camera or the like that is disposed vertically above and longitudinally behind a fisheye camera or the like on a vehicle, both of which are laterally aligned with respect to the vehicle. This is a common vehicle camera setup which has never been exploited to provide stereo vision. Likewise, the stereo pair may include a left or right looking camera and a forward looking camera, or a left or right looking camera and a backward looking camera, etc. Again, any of the cameras may be pinhole cameras, fisheye cameras, etc. The optical axes can be parallel but vertically disposed, disposed at angles, longitudinally offset, etc.

Figure 1:
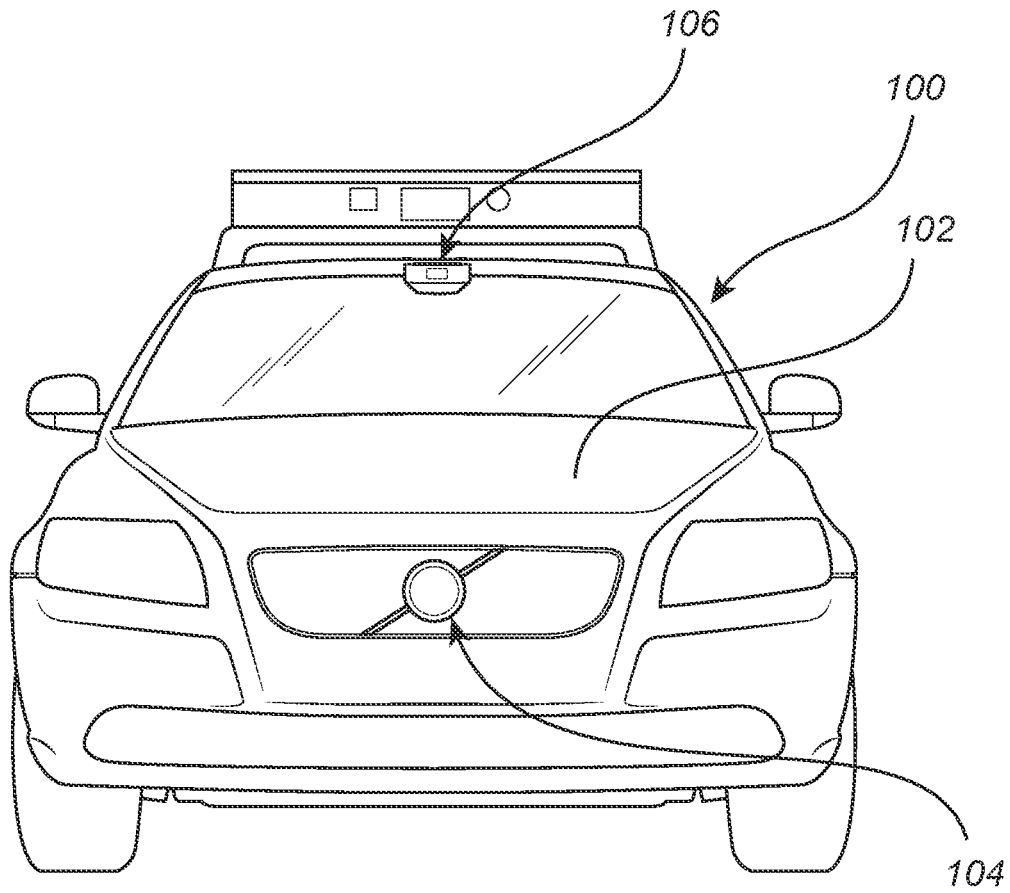
FIG. 1 is a front perspective view of a vehicle including one illustrative embodiment of the stereo pair camera system of the present disclosure using dissimilar vertically disposed cameras.

Referring now specifically to FIG. 1, in one illustrative embodiment, the camera stereo pair system 102 is coupled to and implanted in a vehicle 100. The camera stereo pair system 102 includes a first fisheye camera 104 and a second pinhole camera 106, although different types of cameras could be used as well. As illustrated, the first fisheye camera 104 is disposed in the front grill of the vehicle 100, longitudinally in front of and vertically below the second pinhole camera 106, which is disposed behind or adjacent to the top of the windshield of the vehicle 100. It will be readily apparent to those of ordinary skill in the art that other camera locations can be utilized as well.

As illustrated, the first fisheye camera 104 is disposed at a longitudinal position (X) of 3.873 m, which is relative to the center of the rear axle of the vehicle 100, with values towards the front of the vehicle 100 being positive and values towards the rear of the vehicle 100 being negative. The first fisheye camera 104 is disposed at a lateral position (Y) of 0 m, which is relative to the center of the rear axle of the vehicle 100, with values towards the left of the vehicle 100 being positive and values towards the right of the vehicle 100 being negative. The first fisheye camera 104 is disposed at a vertical position (Z) of 0.406 m, which is relative to the center of the rear axle of the vehicle 100, with values towards the top of the vehicle 100 being positive and values towards the bottom of the vehicle 100 being negative. The fisheye camera 104 has a yaw angle around the Z axis of the vehicle 100 of 0 degrees. The fisheye camera 104 has a pitch angle around the Y axis of the vehicle 100 of 26 degrees. The fisheye camera 104 has a roll angle around the X axis of the vehicle 100 of 0 degrees.

As illustrated, the second pinhole camera 106 is disposed at a longitudinal position (X) of 2.632 m, which is relative to the center of the rear axle of the vehicle 100, with values towards the front of the vehicle 100 being positive and values towards the rear of the vehicle 100 being negative. The second pinhole camera 106 is disposed at a lateral position (Y) of 0 m, which is relative to the center of the rear axle of the vehicle 100, with values towards the left of the vehicle 100 being positive and values towards the right of the vehicle 100 being negative. The second pinhole camera 106 is disposed at a vertical position (Z) of 1.67339 m, which is relative to the center of the rear axle of the vehicle 100, with values towards the top of the vehicle 100 being positive and values towards the bottom of the vehicle 100 being negative. The second pinhole camera 106 has a yaw angle around the Z axis of the vehicle 100 of 0 degrees. The second pinhole camera 106 has a pitch angle around the Y axis of the vehicle 100 of 0 degrees. The second pinhole camera 106 has a roll angle around the X axis of the vehicle 100 of 0 degrees.

The fields of view of the first fisheye camera 104 and the second pinhole camera 106 are thus similar laterally and overlap vertically, with the second pinhole camera 106 being from a higher vertical perspective than the first fisheye camera 104. The images obtained using each of the first fisheye camera 104 and the second pinhole camera 106 are processed by a stereo vision algorithm and used to determine depth estimates for objects/scenes present in the images, even though dissimilar types of cameras are used and images are provided. Because the location of each of the cameras 104, 106 is known with respect to the other, the stereo pair can effectively be defined and accounted for with minimal computational complexity.

Most stereo vision systems use parallax error to estimate depth. A single scene is recorded from two different viewing angles using two different cameras, and depth is estimated from the measure of parallax error. Such techniques are well known to those of ordinary skill in the art and are not the subject of the present disclosure. A first step in measuring parallax error and performing depth estimation is assessing the correspondency of pixels of interest in the two images utilized, which is accomplished with knowledge of the relative camera positions and orientations, which here are relatively unconstrained, provided that the images overlap.

Figure 2:
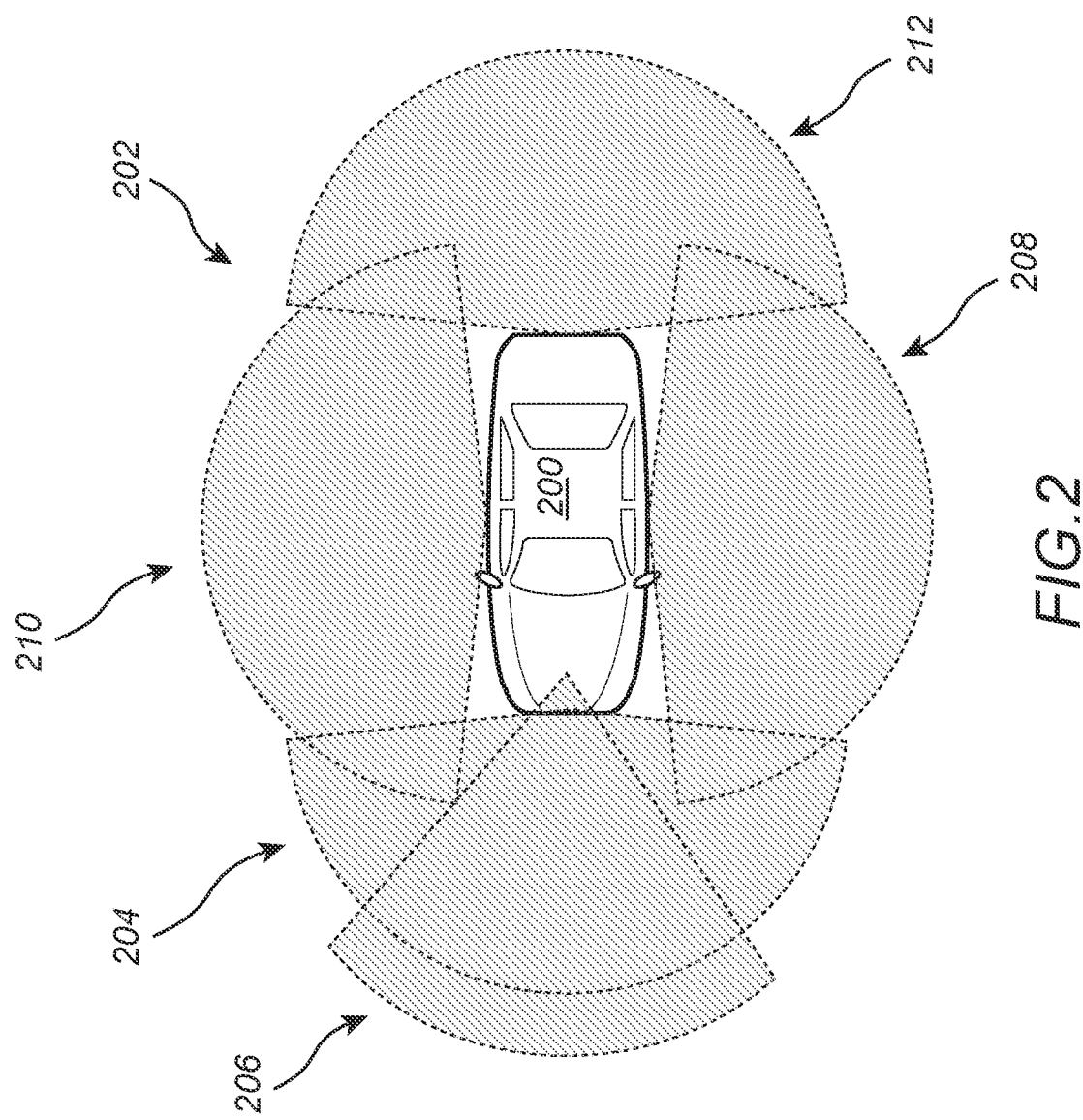
FIG. 2 is a top schematic view of a vehicle including multiple alternative illustrative embodiments of the stereo pair camera system of the present disclosure using similar or dissimilar horizontally and/or vertically disposed cameras.

Referring now specifically to FIG. 2, in multiple alternative illustrative embodiments, with respect to the vehicle 200, the stereo pair camera system 202 includes a first forward looking camera (fisheye, pinhole, etc.) with a first forward field of view 204 and a second forward looking camera (fisheye, pinhole, etc.) with an overlapping second forward field of view 206, a second left looking camera (fisheye, pinhole, etc.) with an overlapping second left field of view 208, or a second right looking camera (fisheye, pinhole, etc.) with an overlapping second right field of view 210. Alternatively, the stereo pair camera system 202 includes a first backward looking camera (fisheye, pinhole, etc.) with a first backward field of view 212 and a second left looking camera (fisheye, pinhole, etc.) with an overlapping second left field of view 208 or a second right looking camera (fisheye, pinhole, etc.) with an overlapping second right field of view 210. Various of these cameras may be disposed in the same plane at the same vertical height (Z) or in different planes at different vertical heights (Z). They may be longitudinally (X) and/or laterally (Y) spaced, and have different yaw, pitch, and roll angles, provided all of these specifications are known and the fields of view overlap. This is the freedom of the present disclosure. Positions and orientations are accounted for computationally in configurations that are dictated by the vehicle application, for example. The cameras may be of the same type or different types. In this manner, different fisheye cameras, with different orientations and non-parallel optical axes, can be used for depth estimation, for example.

Figure 3:
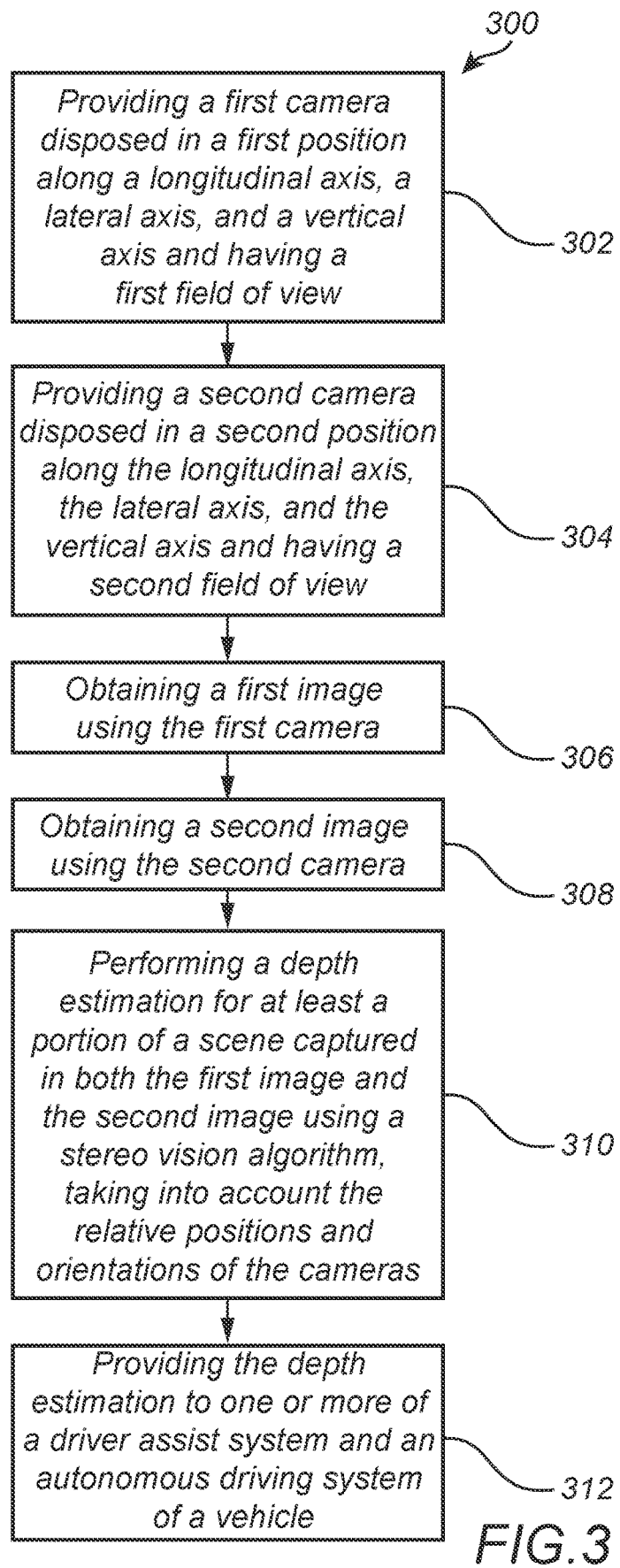
FIG. 3 is a flowchart of one illustrative embodiment of the stereo pair camera method of the present disclosure.

FIG. 3 is a flowchart of one illustrative embodiment of the depth estimation method 300 of the present disclosure. The method 300 includes providing a first camera disposed in a first position along a longitudinal axis, a lateral axis, and a vertical axis and having a first field of view (step 302) and providing a second camera disposed in a second position along the longitudinal axis, the lateral axis, and the vertical axis and having a second field of view (step 304). The first camera is a of a first type and the second camera is of a second type that is different from the first type, and the first field of view overlaps with the second field of view. The method 300 further includes obtaining a first image using the first camera (step 306) and obtaining a second image using the second camera (step 308). The method further includes performing a depth estimation for at least a portion of a scene captured in both the first image and the second image using a stereo vision algorithm, taking into account the relative positions and orientations of the cameras (step 310). The first position is spaced apart from the second position along one or more of the lateral axis, the longitudinal axis, and the vertical axis. The first type is a fisheye camera and the second type is a pinhole camera. Alternatively, the first type and the second type are each one of a forward looking camera and a backward looking camera. Alternatively, the first type is one of a forward looking camera and a backward looking camera and the second type is a side looking camera. The method 300 further includes providing the depth estimation to one or more of a driver assist system and an autonomous driving system of a vehicle (step 312).

It is to be recognized that, depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

Figure 4:
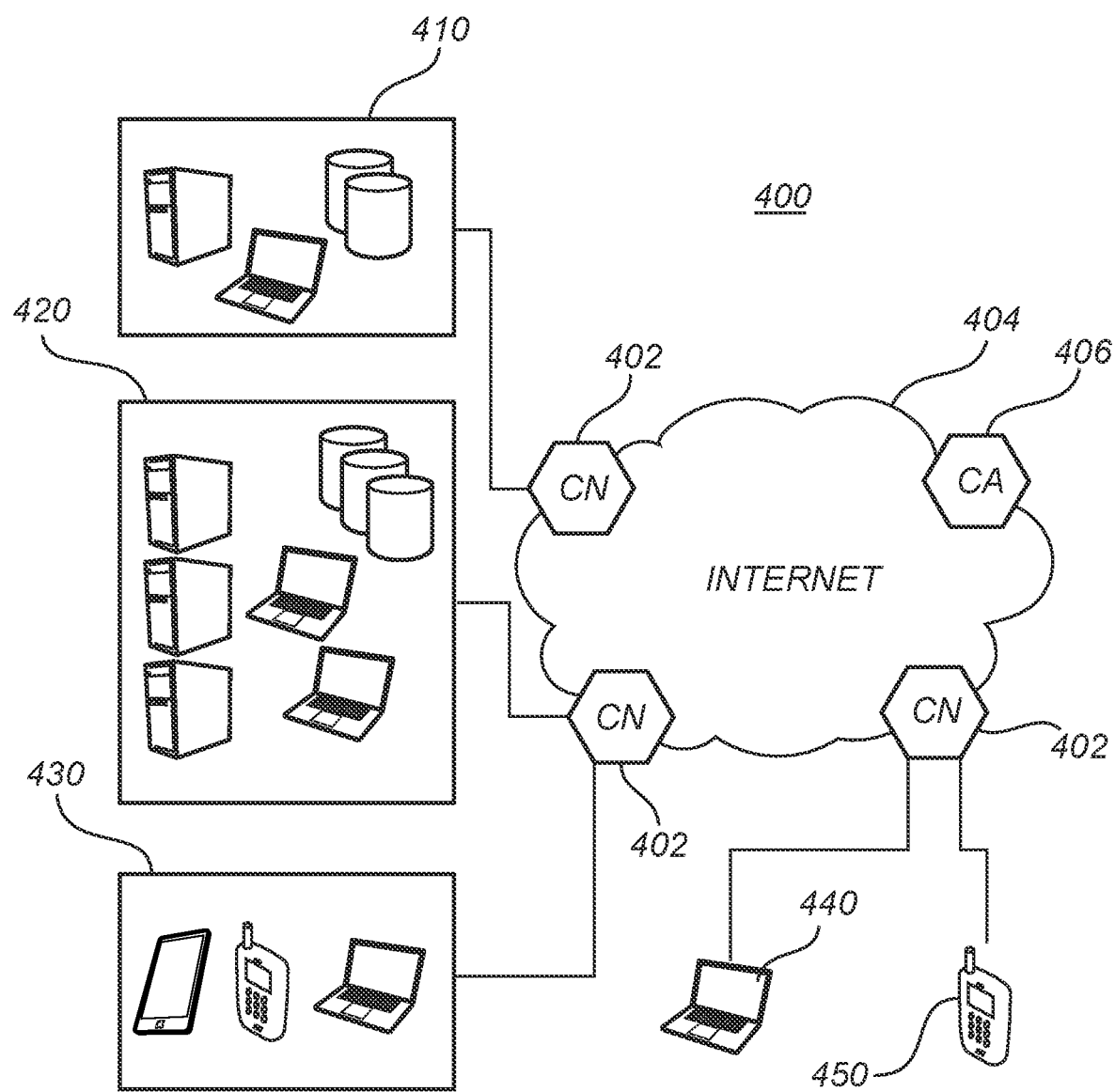
FIG. 4 is a network diagram of a cloud-based computational system for implementing various cloud-based services of the present disclosure, as appropriate.
Figure 5:
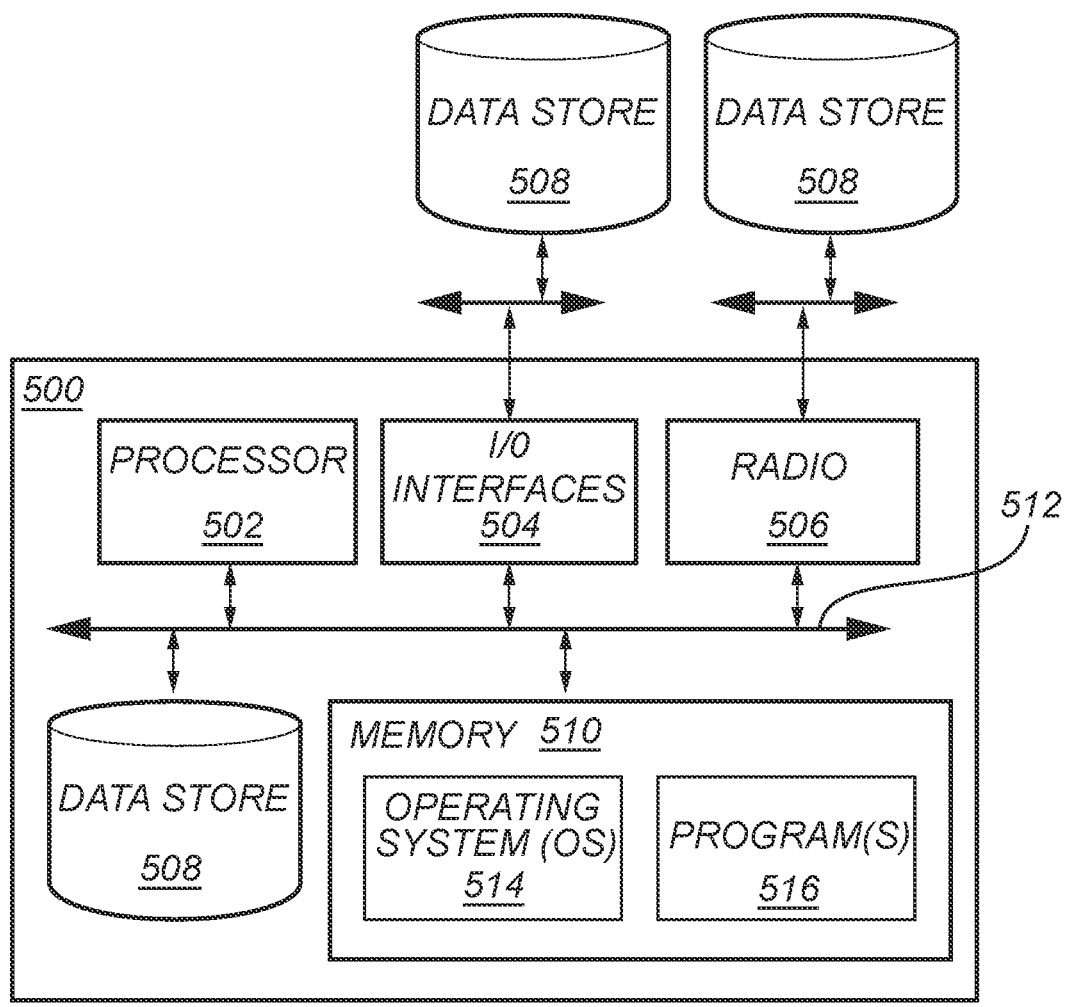
FIG. 5 is a block diagram of a server that may be used in the cloud-based computational system of FIG. 4 or stand-alone, as appropriate.

FIG. 4 is a network diagram of a cloud-based computational system 400 for implementing various cloud-based services of the present disclosure, as appropriate. The cloud-based system 400 includes one or more cloud nodes (CNs) 402 communicatively coupled to the Internet 404 or the like. The cloud nodes 402 may be implemented as a server 500 (as illustrated in FIG. 5) or the like and can be geographically diverse from one another, such as located at various data centers around the country or globe. Further, the cloud-based system 400 can include one or more central authority (CA) nodes 406, which similarly can be implemented as the server 500 and be connected to the CNs 402. For illustration purposes, the cloud-based system 400 can connect to a regional office 410, headquarters 420, various employee's homes 430, laptops/desktops 440, and mobile devices 450, each of which can be communicatively coupled to one of the CNs 402. These locations 410, 420, and 430, and devices 440 and 450 are shown for illustrative purposes, and those skilled in the art will recognize there are various access scenarios to the cloud-based system 400, all of which are contemplated herein. The devices 440 and 450 can be so-called road warriors, i.e., users off-site, on-the-road, etc. The cloud-based system 400 can be a private cloud, a public cloud, a combination of a private cloud and a public cloud (hybrid cloud), or the like.

Again, the cloud-based system 400 can provide any functionality through services, such as software-as-a-service (SaaS), platform-as-a-service, infrastructure-as-a-service, security-as-a-service, Virtual Network Functions (VNFs) in a Network Functions Virtualization (NFV) Infrastructure (NFVI), etc. to the locations 410, 420, and 430 and devices 440 and 450. Previously, the Information Technology (IT) deployment model included enterprise resources and applications stored within an enterprise network (i.e., physical devices), behind a firewall, accessible by employees on site or remote via Virtual Private Networks (VPNs), etc. The cloud-based system 400 is replacing the conventional deployment model. The cloud-based system 400 can be used to implement these services in the cloud without requiring the physical devices and management thereof by enterprise IT administrators.

Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "software as a service" (SaaS) is sometimes used to describe application programs offered through cloud computing. A common shorthand for a provided cloud computing service (or even an aggregation of all existing cloud services) is "the cloud." The cloud-based system 400 is illustrated herein as one example embodiment of a cloud-based system, and those of ordinary skill in the art will recognize the systems and methods described herein are not necessarily limited thereby.

FIG. 5 is a block diagram of a server 500, which may be used in the cloud-based computational system 400 (FIG. 4), in other systems, or stand-alone, as appropriate. For example, the CNs 402 (FIG. 4) and the central authority nodes 406 (FIG. 4) may be formed as one or more of the servers 500. The server 500 may be a digital computer that, in terms of hardware architecture, generally includes a processor 502, input/output (I/O) interfaces 504, a network interface 506, a data store 508, and memory 510. It should be appreciated by those of ordinary skill in the art that FIG. 5 depicts the server 500 in an oversimplified manner, and a practical embodiment may include additional components and suitably configured processing logic to support known or conventional operating features that are not described in detail herein. The components (502, 504, 506, 508, and 510) are communicatively coupled via a local interface 512. The local interface 512 may be, for example, but is not limited to, one or more buses or other wired or wireless connections, as is known in the art. The local interface 512 may have additional elements, which are omitted for simplicity, such as controllers, buffers (caches), drivers, repeaters, and receivers, among many others, to enable communications. Further, the local interface 512 may include address, control, and/or data connections to enable appropriate communications among the aforementioned components.

The processor 502 is a hardware device for executing software instructions. The processor 502 may be any custom made or commercially available processor, a central processing unit (CPU), an auxiliary processor among several processors associated with the server 500, a semiconductor-based microprocessor (in the form of a microchip or chipset), or generally any device for executing software instructions. When the server 500 is in operation, the processor 502 is configured to execute software stored within the memory 510, to communicate data to and from the memory 510, and to generally control operations of the server 500 pursuant to the software instructions. The I/O interfaces 504 may be used to receive user input from and/or for providing system output to one or more devices or components.

The network interface 506 may be used to enable the server 500 to communicate on a network, such as the Internet 404 (FIG. 4). The network interface 506 may include, for example, an Ethernet card or adapter (e.g., 10BaseT, Fast Ethernet, Gigabit Ethernet, or 10 GbE) or a Wireless Local Area Network (WLAN) card or adapter (e.g., 802.11a/b/g/n/ac). The network interface 506 may include address, control, and/or data connections to enable appropriate communications on the network. A data store 508 may be used to store data. The data store 508 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 508 may incorporate electronic, magnetic, optical, and/or other types of storage media. In one example, the data store 508 may be located internal to the server 500, such as, for example, an internal hard drive connected to the local interface 512 in the server 500. Additionally, in another embodiment, the data store 508 may be located external to the server 500 such as, for example, an external hard drive connected to the I/O interfaces 504 (e.g., a SCSI or USB connection). In a further embodiment, the data store 508 may be connected to the server 500 through a network, such as, for example, a network-attached file server.

The memory 510 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 510 may incorporate electronic, magnetic, optical, and/or other types of storage media. Note that the memory 510 may have a distributed architecture, where various components are situated remotely from one another but can be accessed by the processor 502. The software in memory 510 may include one or more software programs, each of which includes an ordered listing of executable instructions for implementing logical functions. The software in the memory 510 includes a suitable operating system (O/S) 514 and one or more programs 516. The operating system 514 essentially controls the execution of other computer programs, such as the one or more programs 516, and provides scheduling, input-output control, file and data management, memory management, and communication control and related services. The one or more programs 516 may be configured to implement the various processes, algorithms, methods, techniques, etc. described herein.

It will be appreciated that some embodiments described herein may include one or more generic or specialized processors ("one or more processors") such as microprocessors; central processing units (CPUs); digital signal processors (DSPs); customized processors such as network processors (NPs) or network processing units (NPUs), graphics processing units (GPUs), or the like; field programmable gate arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more application-specific integrated circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Figure 6:
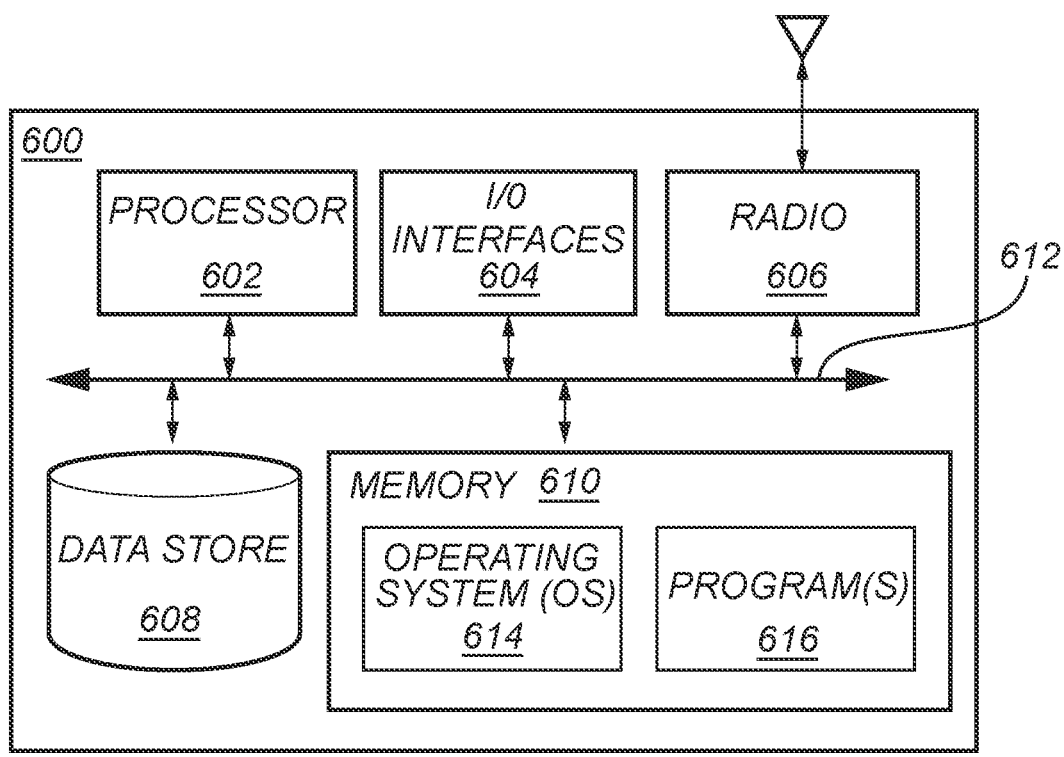
FIG. 6 is a block diagram of a vehicle or user device that may be used in the cloud-based computational system of FIG. 4 or stand-alone, as appropriate.

FIG. 6 is a block diagram of a vehicle or user device 600, which may be used in the cloud-based computational system 400 (FIG. 4), as part of a network, or stand-alone, as appropriate. Again, the user device 600 can be a vehicle, a smartphone, a tablet, a smartwatch, an Internet of Things (IoT) device, a laptop, a virtual reality (VR) headset, etc. The user device 600 can be a digital device that, in terms of hardware architecture, generally includes a processor 602, I/O interfaces 604, a radio 606, a data store 608, and memory 610. It should be appreciated by those of ordinary skill in the art that FIG. 6 depicts the user device 600 in an oversimplified manner, and a practical embodiment may include additional components and suitably configured processing logic to support known or conventional operating features that are not described in detail herein. The components (602, 604, 606, 608, and 610) are communicatively coupled via a local interface 612. The local interface 612 can be, for example, but is not limited to, one or more buses or other wired or wireless connections, as is known in the art. The local interface 612 can have additional elements, which are omitted for simplicity, such as controllers, buffers (caches), drivers, repeaters, and receivers, among many others, to enable communications. Further, the local interface 612 may include address, control, and/or data connections to enable appropriate communications among the aforementioned components.

The processor 602 is a hardware device for executing software instructions. The processor 602 can be any custom made or commercially available processor, a CPU, an auxiliary processor among several processors associated with the user device 600, a semiconductor-based microprocessor (in the form of a microchip or chipset), or generally any device for executing software instructions. When the user device 600 is in operation, the processor 602 is configured to execute software stored within the memory 610, to communicate data to and from the memory 610, and to generally control operations of the user device 600 pursuant to the software instructions. In an embodiment, the processor 602 may include a mobile optimized processor such as optimized for power consumption and mobile applications. The I/O interfaces 604 can be used to receive user input from and/or for providing system output. User input can be provided via, for example, a keypad, a touch screen, a scroll ball, a scroll bar, buttons, a barcode scanner, and the like. System output can be provided via a display device such as a liquid crystal display (LCD), touch screen, and the like.

The radio 606 enables wireless communication to an external access device or network. Any number of suitable wireless data communication protocols, techniques, or methodologies can be supported by the radio 606, including any protocols for wireless communication. The data store 608 may be used to store data. The data store 608 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 608 may incorporate electronic, magnetic, optical, and/or other types of storage media.

Again, the memory 610 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 610 may incorporate electronic, magnetic, optical, and/or other types of storage media. Note that the memory 610 may have a distributed architecture, where various components are situated remotely from one another, but can be accessed by the processor 602. The software in memory 610 can include one or more software programs, each of which includes an ordered listing of executable instructions for implementing logical functions. In the example of FIG. 6, the software in the memory 610 includes a suitable operating system 614 and programs 616. The operating system 614 essentially controls the execution of other computer programs and provides scheduling, input-output control, file and data management, memory management, and communication control and related services. The programs 616 may include various applications, add-ons, etc. configured to provide end user functionality with the user device 600. For example, example programs 616 may include, but not limited to, a web browser, social networking applications, streaming media applications, games, mapping and location applications, electronic mail applications, financial applications, and the like. In a typical example, the end-user typically uses one or more of the programs 616 along with a network, such as the cloud-based system 400 (FIG. 4).

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A stereo pair camera system for depth estimation, the stereo pair camera system comprising:
  a first camera coupled to a vehicle and disposed in a first position along a longitudinal axis, a lateral axis, and a vertical axis of the vehicle and having a first field of view; and
  a second camera coupled to the vehicle and disposed in a second position along the longitudinal axis, the lateral axis, and the vertical axis of the vehicle and having a second field of view;
  wherein the first camera is a of a first type and the second camera is of a second type that is different from the first type;
  wherein the first position is spaced apart from the second position along the longitudinal axis and the vertical axis of the vehicle, with the second position being offset longitudinally behind and vertically above the first position; and
  wherein the first field of view overlaps with the second field of view.

2. The stereo pair camera system of claim 1, wherein the first position is spaced apart from the second position along the lateral axis of the vehicle.

3. The stereo pair camera system of claim 1, wherein the first type is a fisheye camera and the second type is a pinhole camera.

4. The stereo pair camera system of claim 1, wherein the first type and the second type are each one of a forward looking camera and a backward looking camera.

5. The stereo pair camera system of claim 1, wherein the first type is one of a forward looking camera and a backward looking camera and the second type is a side looking camera.

6. The stereo pair camera system of claim 1, wherein the depth estimation of the stereo pair camera system is used by one or more of a driver assist system and an autonomous driving system of the vehicle.

7. A stereo pair camera system for depth estimation, the stereo pair camera system comprising:
  a first camera coupled to a vehicle and disposed in a first position along a longitudinal axis, a lateral axis, and a vertical axis of the vehicle and having a first field of view; and
  a second camera coupled to the vehicle and disposed in a second position along the longitudinal axis, the lateral axis, and the vertical axis of the vehicle and having a second field of view;
  wherein the first position is spaced apart from the second position along the longitudinal axis and the vertical axis of the vehicle, with the second position being offset longitudinally behind and vertically above the first position; and
  wherein the first field of view overlaps with the second field of view.

8. The stereo pair camera system of claim 7, wherein the first position is spaced apart from the second position along the lateral axis of the vehicle.

9. The stereo pair camera system of claim 7, wherein the first camera is a of a first type and the second camera is of a second type that is different from the first type.

10. The stereo pair camera system of claim 9, wherein the first type is a fisheye camera and the second type is a pinhole camera.

11. The stereo pair camera system of claim 9, wherein the first type and the second type are each one of a forward looking camera and a backward looking camera.

12. The stereo pair camera system of claim 9, wherein the first type is one of a forward looking camera and a backward looking camera and the second type is a side looking camera.

13. The stereo pair camera system of claim 7, wherein the depth estimation of the stereo pair camera system is used by one or more of a driver assist system and an autonomous driving system of the vehicle.

14. A depth estimation method, comprising:
provide a first camera coupled to a vehicle and disposed in a first position along a longitudinal axis, a lateral axis, and a vertical axis of the vehicle and having a first field of view;
providing a second camera coupled to the vehicle and disposed in a second position along the longitudinal axis, the lateral axis, and the vertical axis of the vehicle and having a second field of view;
wherein the first camera is a of a first type and the second camera is of a second type that is different from the first type;
wherein the first position is spaced apart from the second position along the longitudinal axis and the vertical axis of the vehicle, with the second position being offset longitudinally behind and vertically above the first position; and
wherein the first field of view overlaps with the second field of view;
obtaining a first image using the first camera;
obtaining a second image using the second camera; and
performing a depth estimation for at least a portion of a scene captured in both the first image and the second image using a stereo vision algorithm.

15. The depth estimation method of claim 14, wherein the first position is spaced apart from the second position along the lateral axis of the vehicle.

16. The depth estimation method of claim 14, wherein one or more of:
the first type is a fisheye camera and the second type is a pinhole camera,
the first type and the second type are each one of a forward looking camera and a backward looking camera; and
the first type is one of a forward looking camera and a backward looking camera and the second type is a side looking camera.

17. The depth estimation method of claim 14, further comprising providing the depth estimation to one or more of a driver assist system and an autonomous driving system of the vehicle.

18. The stereo pair camera system of claim 1, wherein the first camera has a first viewing angle from the vehicle and the second camera has a second viewing angle from the vehicle that is different from the first viewing angle.

* * * * *